United States Patent
Nishitani

(10) Patent No.: US 10,356,325 B2
(45) Date of Patent: Jul. 16, 2019

(54) IMAGE CAPTURING APPARATUS TO ADDRESS SHAKE

(71) Applicant: CANON KABUSHIKI KAISHA, Tokyo (JP)

(72) Inventor: Hitoshi Nishitani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/920,255

(22) Filed: Mar. 13, 2018

(65) Prior Publication Data
US 2018/0288332 A1    Oct. 4, 2018

(30) Foreign Application Priority Data

Mar. 28, 2017  (JP) .................. 2017-062669

(51) Int. Cl.
| H04N 5/225 | (2006.01) |
| H04N 5/232 | (2006.01) |

(52) U.S. Cl.
CPC ....... *H04N 5/23287* (2013.01); *H04N 5/2253* (2013.01); *H04N 5/23245* (2013.01)

(58) Field of Classification Search
CPC ............. H04N 5/2253; H04N 5/23245; H04N 5/23287
See application file for complete search history.

(56) References Cited

U.S. PATENT DOCUMENTS

| | | | | |
|---|---|---|---|---|
| 6,567,126 B1 * | 5/2003 | Slatter | ............. | G02B 7/28 348/345 |
| 6,686,954 B1 * | 2/2004 | Kitaguchi | ............. | H04N 5/2253 348/208.1 |
| 7,634,184 B2 * | 12/2009 | Woehler | ............. | G03B 5/08 348/294 |
| 7,978,222 B2 * | 7/2011 | Schneider | ............. | G03B 17/00 348/208.1 |
| 10,084,957 B2 * | 9/2018 | Tsuchiya | ............. | H04N 5/23229 |
| 2004/0233650 A1 * | 11/2004 | Miyashita | ............. | H04N 5/2253 361/760 |
| 2006/0061660 A1 * | 3/2006 | Brackmann | ............. | H04N 5/2253 348/208.1 |
| 2007/0279765 A1 * | 12/2007 | Takahashi | ............. | G02B 27/646 359/697 |
| 2012/0293671 A1 * | 11/2012 | Chan | ............. | H04N 5/23258 348/208.5 |
| 2015/0256756 A1 * | 9/2015 | Sakurai | ............. | H04N 5/23287 348/208.5 |
| 2016/0269606 A1 * | 9/2016 | Numako | ............. | G03B 5/00 |

FOREIGN PATENT DOCUMENTS

| JP | 2000258813 A | * | 9/2000 |
| JP | 2011-095467 A | | 5/2011 |
| JP | 2012-016107 A | | 1/2012 |
| JP | 2014-072986 A | | 4/2014 |
| JP | 2016-086541 A | | 5/2016 |

* cited by examiner

*Primary Examiner* — Amy R Hsu
(74) *Attorney, Agent, or Firm* — Canon USA, Inc. IP Division

(57) ABSTRACT

An image capturing apparatus includes an image sensor, a frame configured to support the image sensor, and one or more driving members configured to move the frame in a direction parallel with an imaging plane of the image sensor. The driving members include a vibration unit that generates vibration. The vibration unit of at least one of the driving members overlaps a center of the imaging plane of the image sensor, when viewed in a direction orthogonal to the imaging plane of the image sensor.

9 Claims, 9 Drawing Sheets

FIG.3A1
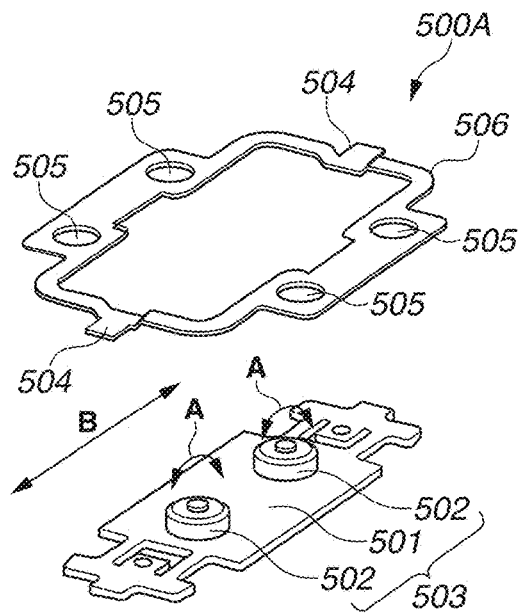
FIG.3B1
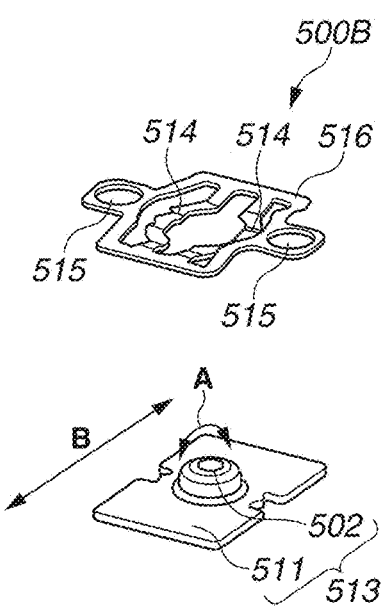
FIG.3A2
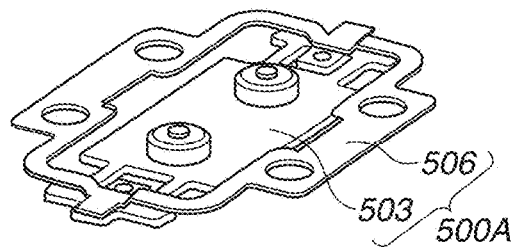
FIG.3B2
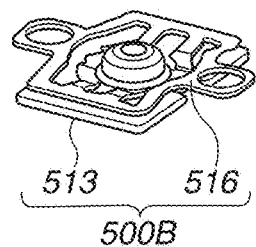

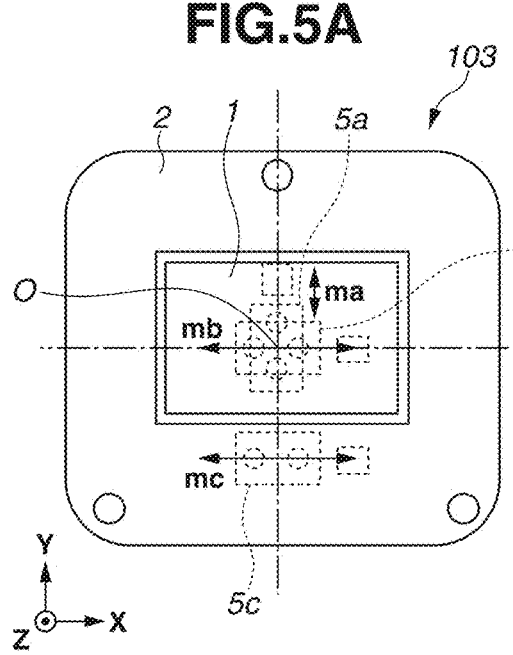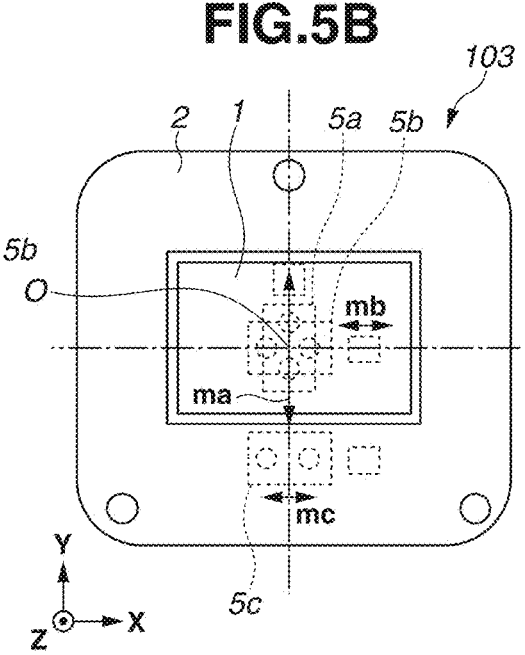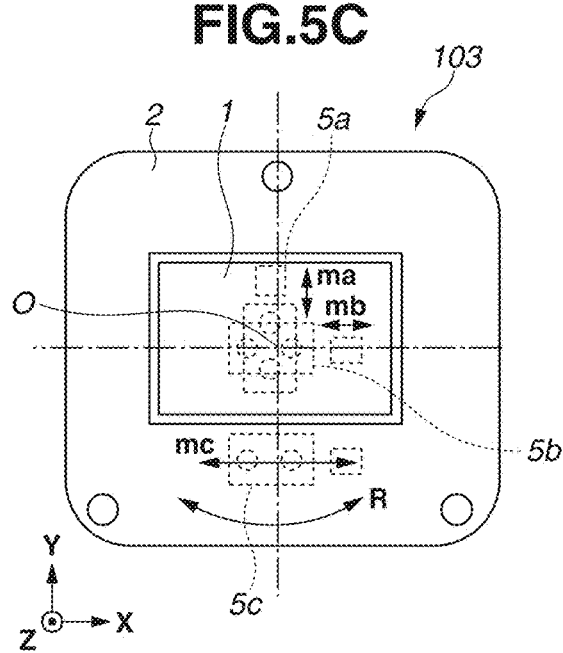

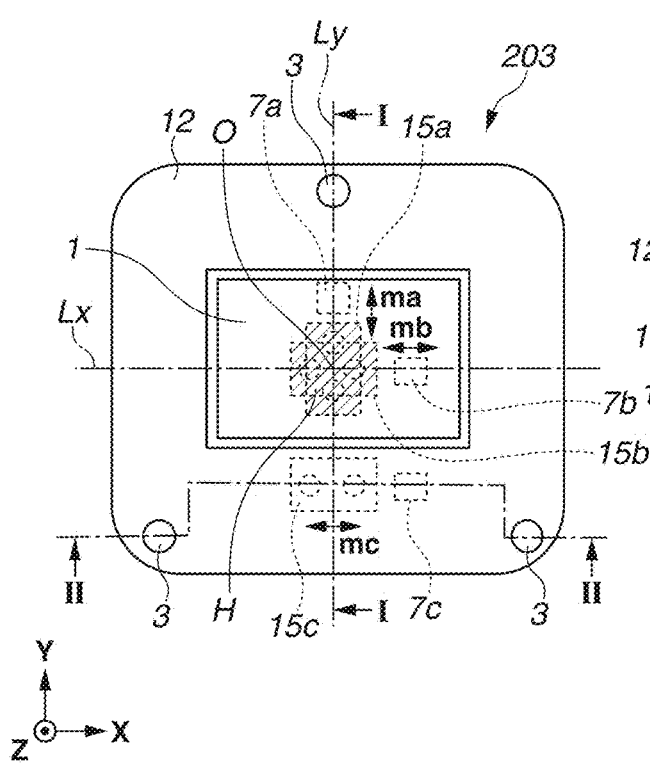
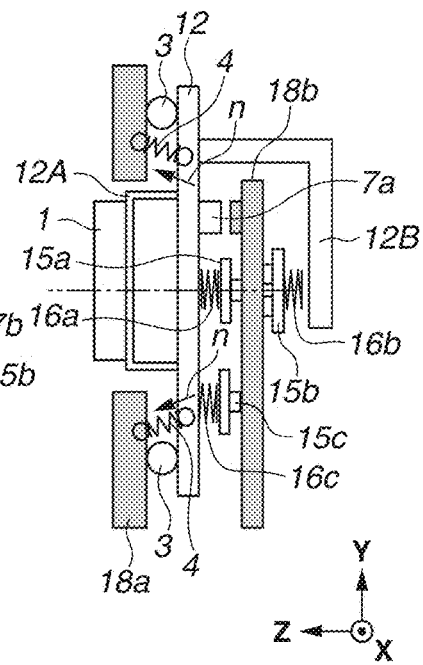
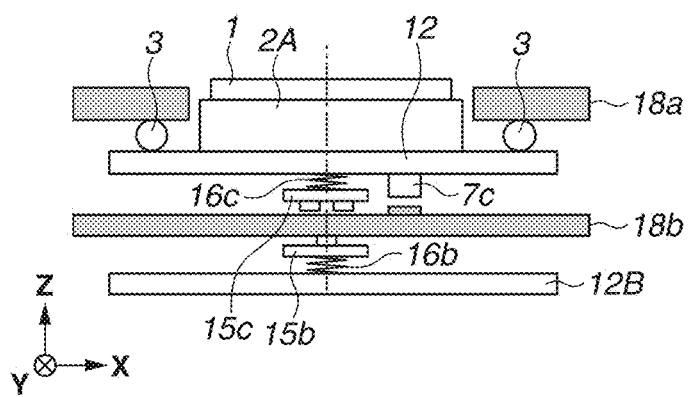
FIG.6A
FIG.6B
FIG.6C

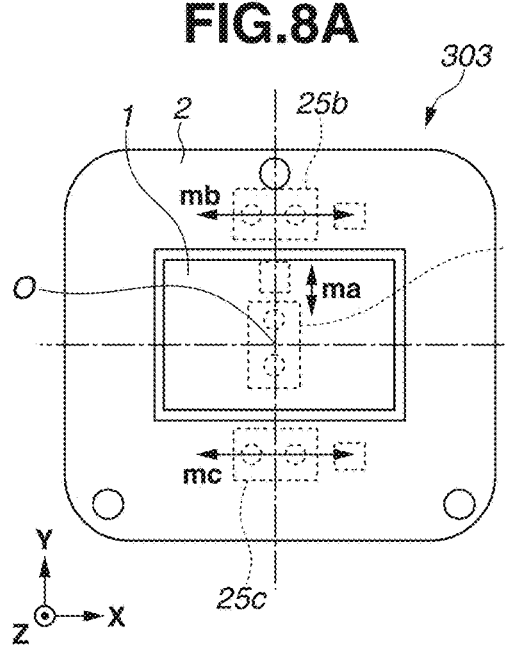
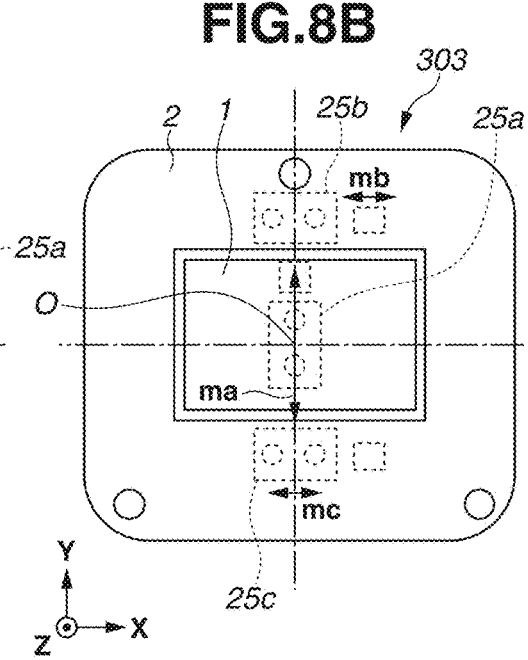
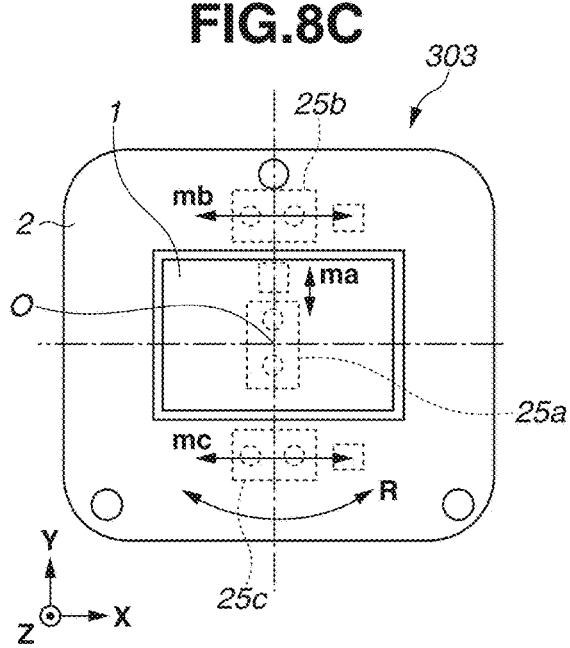

IMAGE CAPTURING APPARATUS TO ADDRESS SHAKE

BACKGROUND OF THE INVENTION

Field of the Invention

The present disclosure relates to an image capturing apparatus.

Description of the Related Art

An exchangeable lens device that is attachable to and detachable from an image capturing apparatus includes two types of lens devices, i.e., a lens device including an image stabilizing mechanism that corrects camera shake generated due to a user's hand shake and a lens device not including the image stabilizing mechanism. The image stabilizing mechanism corrects the camera shake by moving an optical system. The lens device including the image stabilizing mechanism can correct camera shift-shake in a direction orthogonal to an optical axis (hereinafter, simply referred to as camera shift-shake), but cannot correct camera roll-shake in a direction of rotation about an axis in parallel with the optical axis (hereinafter, simply referred to as camera roll-shake).

To correct the camera roll-shake, an image sensor of the image capturing apparatus needs to be rotated. In this context, Japanese Patent Application Laid-Open No. 2011-095467 discusses an image shake correction device having a rotational substrate, fixedly holding the image sensor, supported by a fixing portion via a rotation shaft. The image shake correction device discussed in Japanese Patent Application Laid-Open No. 2011-095467 requires a supporting mechanism for the rotation shaft for rotating the image sensor. The image shake correction device discussed in Japanese Patent Application Laid-Open No. 2011-095467 only focuses on correcting the camera roll-shake, and thus if the attached lens device does not include a shift-shake correcting mechanism, the camera shift-shake cannot be corrected with such a configuration.

Further, Japanese Patent Application Laid-Open No. 2012-016107, Japanese Patent Application Laid-Open No. 2016-086541, and Japanese Patent Application Laid-Open No. 2014-072986 each discuss an example of a vibration motor used for the image stabilizing mechanism.

The configuration of the image shake correction device discussed in Japanese Patent Application Laid-Open No. 2011-095467, which can correct only the camera roll-shake, requires the supporting mechanism for the rotation shaft, and thus is complex. When the attached lens device does not include the shift-shake correcting mechanism, the camera shift-shake cannot be corrected.

SUMMARY OF THE INVENTION

According to an aspect of the present disclosure, an image capturing apparatus includes an image sensor, a frame configured to support the image sensor, and one or more driving members configured to move the frame in a direction parallel with an imaging plane of the image sensor. The driving members include a vibration unit that generates vibration, and wherein the vibration unit of at least one of the driving members overlap a center of the imaging plane of the image sensor, when viewed in a direction orthogonal to the imaging plane of the image sensor.

Further features and aspects of the present disclosure will become apparent from the following description of numerous example embodiments with reference to the attached drawings.

BRIEF DESCRIPTION OF THE DRAWINGS

FIGS. 3A1, 3A2, 3B1, and 3B2 are diagrams illustrating an example of a configuration of a vibration motor.

FIGS. 5A, 5B, and 5C are diagrams illustrating operations performed by the image stabilizing mechanism according to the first example embodiment.

FIGS. 6A, 6B, and 6C are diagrams illustrating an example of a configuration of an image stabilizing mechanism according to a second example embodiment.

FIGS. 8A, 8B, and 8C are diagrams illustrating operations performed by the image stabilizing mechanism according to the third example embodiment.

DESCRIPTION OF THE EMBODIMENTS

Numerous example embodiments and other aspects of the present disclosure will be herein described below with reference to the drawings.

Figure 1:
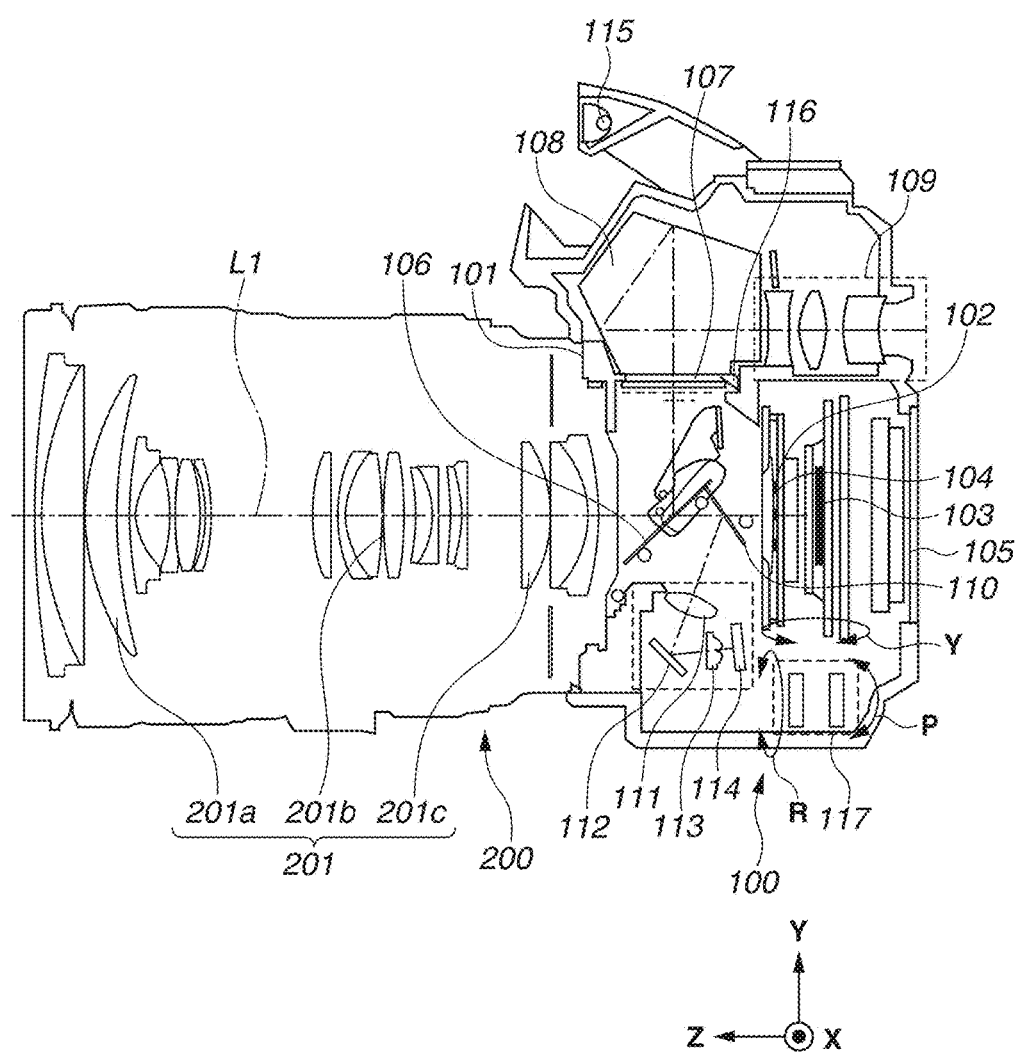
FIG. 1 is a diagram illustrating an example configuration of a camera system.

FIG. 1 is a diagram illustrating a configuration of a camera system according to a first example embodiment. Arrows indicating an X axis direction, a Y axis direction, and a Z axis direction are indicated as required in the drawings. The Z axis direction is an optical axis direction orthogonal to an imaging plane of an image sensor described below. The X axis direction and the Y axis direction are orthogonal to each other and are orthogonal to the Z axis direction.

The camera system includes a digital single-lens reflex camera (hereinafter, referred to as a camera) 100 serving as an image capturing apparatus including an image stabilizing mechanism and also includes a lens device 200 that is detachably attached to a mount portion 101 of the camera 100.

The lens device 200 includes an imaging optical system 201. The imaging optical system 201 includes a plurality of lens units 201$a$, 201$b$, and 201$c$ and an aperture stop (not illustrated).

The lens device 200 includes a lens device including a shift-shake correcting mechanism that corrects camera shake caused by a user's hand-shake and a lens device not including the shift-shake correcting mechanism. The lens device including the shift-shake correcting mechanism moves a predetermined lens unit, among the imaging optical system 201, in a direction orthogonal to an optical axis L1 by an amount sufficient for correcting the camera shake, to correct camera shift-shake. This configuration can correct the camera shift-shake, but cannot correct camera roll-shake.

The lens device not including the shift-shake correcting mechanism cannot correct the camera shift-shake or the camera roll-shake.

The lens device 200 is exchangeable, and thus a lens device including the shift-shake correcting mechanism or a lens device not including the shift-shake correcting mechanism may be attached to the camera 100. A difference in an operation of the camera 100 between cases where the attached lens device includes or does not include the shift-shake correcting mechanism will be described below.

The camera 100 includes a focal plane shutter 102, an image sensor unit 103, an optical filter 104, and a display unit 105. The focal plane shutter 102 includes a plurality of shutter blades. The image sensor unit 103 includes an image sensor including a charged coupled device (CCD) sensor or a complementary metal oxide semiconductor (CMOS) sensor with an exposure value controlled with the focal plane shutter 102. The image sensor unit 103 is connected to a control circuit 121 for controlling the image sensor unit 103 via a connection terminal. The image sensor unit 103 photoelectrically converts an object image formed by the imaging optical system 201 and outputs the converted image signal. The image signal output from the image sensor unit 103 is subjected to predetermined processing so as to generate an image signal. The optical filter 104 is arranged on the optical axis L1 between the imaging optical system 201 and the image sensor unit 103. The optical filter 104 includes optical elements, such as an infrared cut filter and a phase plate, stacked one on top of the other. The display unit 105 is provided on a back surface of the camera 100. The display unit 105 displays an image corresponding to the image signal generated as described above. A user can determine framing by monitoring the displayed image as an electronic viewfinder image.

The camera 100 includes a main mirror 106, a focusing screen 107, a pentaprism 108, a viewfinder lens 109, a sub mirror 110, a condenser lens 111, an image reforming lens 113, and a focus detection sensor 114. The main mirror 106 is a half mirror, and reflects a part of a light flux from the imaging optical system 201 and transmits the remaining part of the light flux. An object image, corresponding to the light flux reflected by the main mirror 106, is formed on the focusing screen 107. The viewfinder lens 109 is a lens for monitoring the object image formed on the focusing screen 107 through the pentaprism 108. The focusing screen 107, the pentaprism 108, and the viewfinder lens 109 form a viewfinder optical system. The sub mirror 110 is arranged behind the main mirror 106. The sub mirror 110 reflects and guides the ht flux transmitted through the main mirror 106 to the condenser lens 111. The main mirror 106 and the sub mirror 110 are arranged on the optical axis L1 when an object is monitored through the viewfinder optical system, and are retracted from the optical axis L1 when the object is monitored using the electronic viewfinder image or when image capturing is performed. The image reforming lens 113 splits a light flux received from the sub mirror 110 via the condenser lens 111 and a reflection mirror 112. The focus detection sensor 114 is provided with an area sensor, and photoelectrically converts a pair of object images formed as a result of the splitting by the image reforming lens 113, into a pair of image signals. A phase difference between the pair of image signals is calculated to detect a focusing status of the imaging optical system 201 based on the phase-difference detection system.

The camera 100 further includes a movable flash unit 115, an information-in-optical-viewfinder display unit 116, and a camera shake detection sensor 117. The flash unit 115 can move between a flash position and a stored position. At the flash position, the flash unit 115 protrudes from the camera 100 and at the stored position, the flash unit 115 is stored in the camera 100. The information-in-optical-viewfinder display unit 116 displays predetermined information on the focusing screen 107. The camera shake detection sensor 117 detects camera shake in a pitch direction, a yaw direction, and a roll direction. The camera shake detection sensor 117 detects camera pitch-shake P (angular vibration in a direction of rotation about an X axis), camera yaw-shake Y (angular vibration in a direction of rotation about a Y axis), and camera roll-shake R (angular vibration in a direction of rotation about a Z axis). The control circuit 121 calculates amounts of the camera shift-shake and the camera roll-shake based on the camera shake in these directions detected by the camera shake detection sensor 117. The control circuit 121 may calculate the amounts of the camera shift-shake and the camera roll-shake based on changes of the image signals, obtained by the image sensor, over time. Further, the control circuit 121 may use both the camera shake detection sensor 117 and the image signals to calculate the amounts of the camera shift-shake and the camera roll-shake. For example, an angular velocity sensor or an acceleration sensor may be used for the camera shake detection sensor 117. A half-pressing operation (image capturing preparation operation) performed on a release switch 122 of the camera 100 triggers an image capturing preparation operation including light metering and automatic focusing. A full-pressing operation (image capturing start operation) performed on the release switch 122 of the camera 100 triggers an image capturing operation in which the image signal is stored as still image data or moving image data in a recording medium 123 such as a semiconductor memory.

Figure 2:
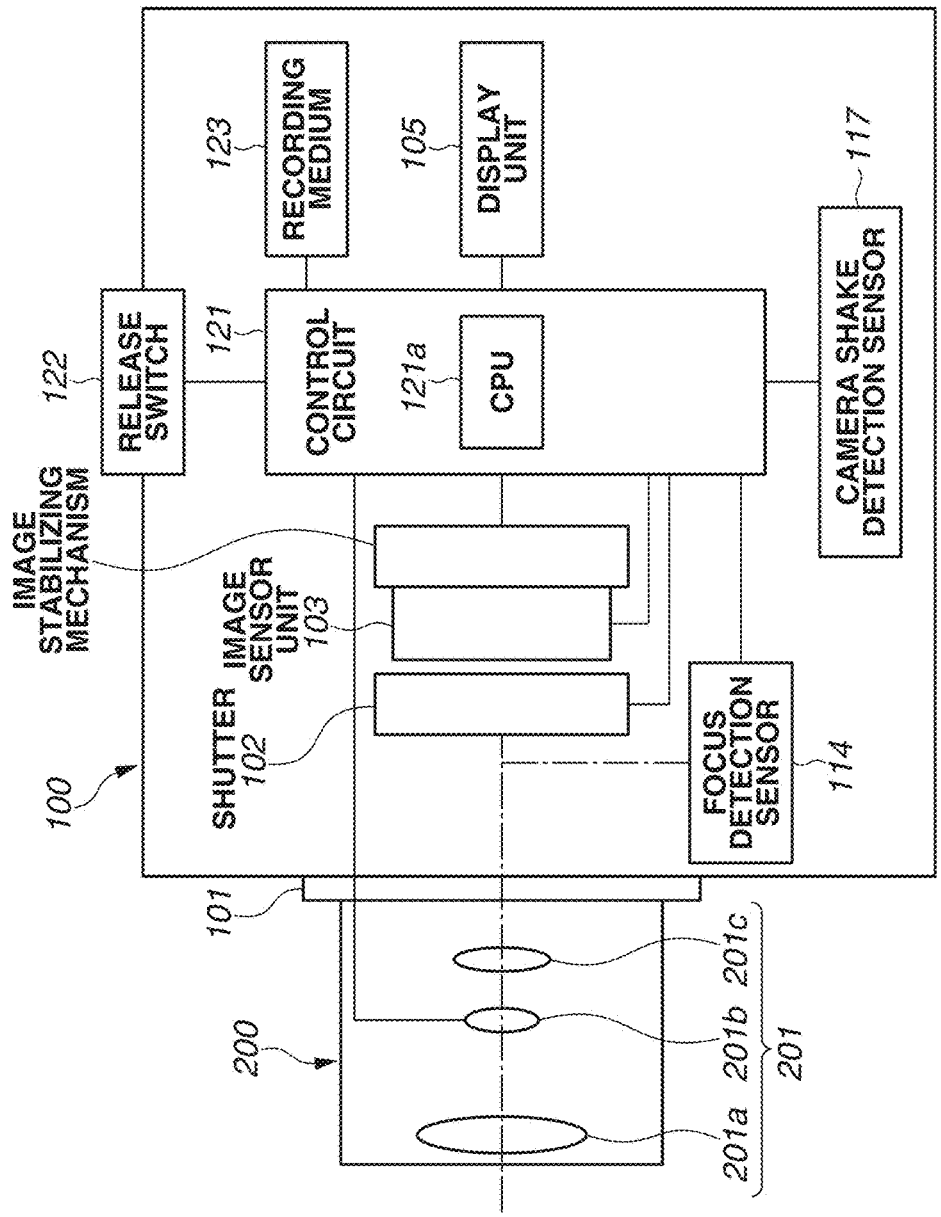
FIG. 2 is a block diagram illustrating an example configuration of the camera system.

FIG. 2 is a block diagram mainly illustrating an example control system of the camera 100 illustrated in FIG. 1.

As illustrated in FIG. 2, the camera 100 includes the control circuit 121 that controls the entire camera 100. The control circuit 121 is electrically connected with components such as the focal plane shutter 102, the image sensor unit 103, the display unit 105, the focus detection sensor 114, the camera shake detection sensor 117, the release switch 122, and the recording medium 123. The control circuit 121 includes a central processing unit (CPU) 121a. The CPU 121a executes a program stored in a memory to control the entire camera 100. The control circuit 121 corresponds to an example of a control unit. The image sensor unit 103 has the image stabilizing mechanism.

Next, a vibration motor 500A used for the image stabilizing mechanism according to the present example embodiment is described. The vibration motor 500A functions as a driving member for moving an image sensor 1.

FIG. 3A1 and FIG. 3A2 are perspective diagrams illustrating an example of a configuration of the vibration motor 500A.

FIG. 3A1 is an exploded perspective view of the vibration motor 500A, and FIG. 3A2 is a perspective view illustrating a configuration of the vibration motor 500A.

The vibration motor 500A includes a vibrator 503, a holding member 506, and a power supply unit such as a flexible printed circuit board. The vibrator 503 includes a vibration unit 501 including a piezoelectric element, and two protrusions 502. The holding member 506 has a shape of a thin plate and includes a first fixing portion 504 and second fixing portions 505. The vibrator 503 is fixed to the holding member 506 via the first fixing portion 504. The vibration motor 500A is attached to an attachment portion via the second fixing portions 505 of the holding member 506.

The vibration motor 500A receives high-frequency alternating current (AC) voltage from the power supply unit so as to generate the ultrasonic vibrations of the vibration unit 501 to cause ultrasonic vibrations of the protrusions 502 in a direction indicated by arrows A. Thus, the vibration motor 500A can move a member that is in pressure contact with the protrusions 502 in a direction indicated by an arrow B. The holding member 506 has a shape of a thin plate, and does not hinder the vibrations of the vibration motor 500A. The holding member 506 can hold the vibrator 503 on the attachment portion with no mechanical response delay in the direction indicated by the arrow B. Japanese Patent Application Laid-Open No. 2012-016107 discusses a configuration of and a driving method for the vibration motor 500A including the two protrusions 502. Japanese Patent Application Laid-Open No. 2014-072986 discusses a configuration of the holding member 506.

FIGS. 3B1 and 3B2 are perspective views illustrating an example of a vibration motor having another configuration.

FIG. 3B1 is an exploded perspective view of a vibration motor 500B. FIG. 3B2 is a perspective view illustrating a configuration of the vibration motor 500B.

The vibration motor 500B includes a vibrator 513, a holding member 516, and a power supply unit such as a flexible printed circuit board. The vibrator 513 includes a vibration unit 511 including a piezoelectric element, and the protrusion 502. The holding member 516 has a shape of a thin plate and includes first fixing portions 514 and second fixing portions 515. Japanese Patent Application Laid-Open No. 2016-086541 discusses a configuration of and a driving method for the vibration motor 500B including a single protrusion.

The vibration motor used for the image stabilizing mechanism may be the vibration motor 500B or any other suitable vibration motor, instead of the vibration motor 500A as in the configuration described below. In FIG. 3B1 and FIG. 3B2, only the vibrator 503 is illustrated with the holding member 506 omitted.

Next, a configuration of the image sensor unit 103 including the image stabilizing mechanism is described.

Figure 4A:
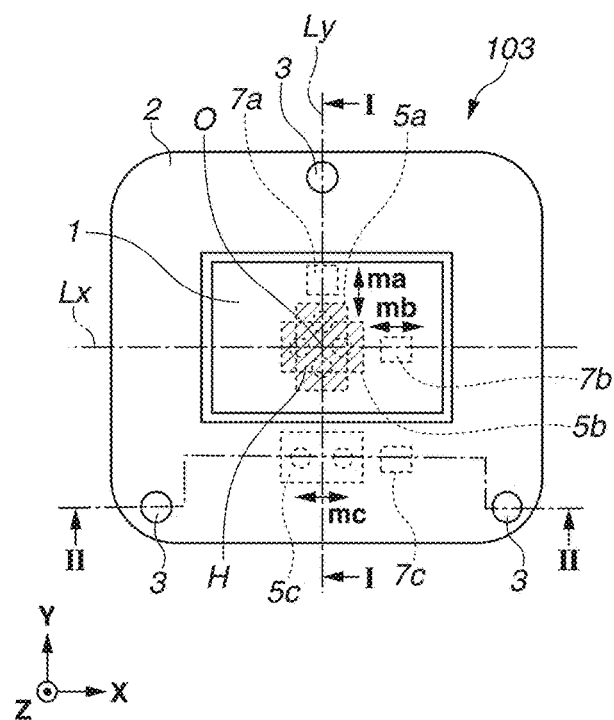
FIGS. 4A, 4B, and 4C are diagrams illustrating an example of a configuration of an image stabilizing mechanism according to a first example embodiment.
Figure 4B:
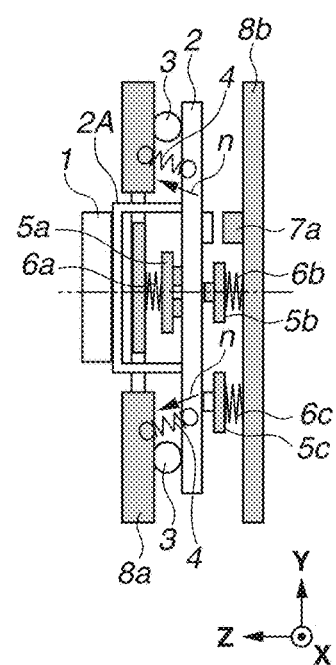
Figure 4C:
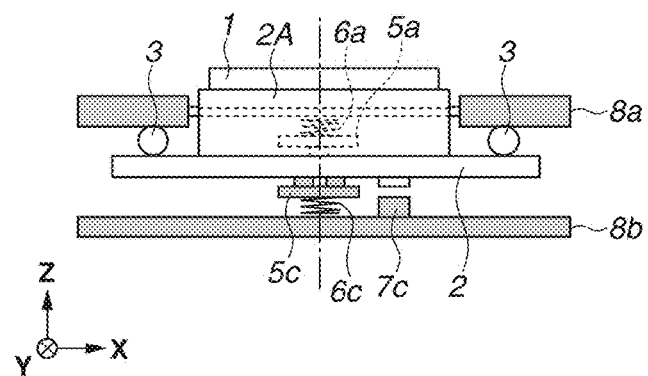

FIGS. 4A, 4B, and 4C are diagrams illustrating a configuration of the image sensor unit 103. More specifically, FIG. 4A is a front view of the image sensor unit 103 as viewed in the optical axis direction (Z axis direction). FIG. 4B is a cross-sectional view taken along line I-I. FIG. 4C is a cross-sectional view taken along line II-II.

The image stabilizing mechanism of the image sensor unit 103 includes the image sensor 1, a frame 2, rolling balls 3, springs 4, vibration motors 5a, 5b, and 5c, springs 6a, 6b, and 6c, sensors 7a, 7b, and 7c, and base portions 8a and 8b.

In FIG. 4A, the springs 4, the springs 6a, 6b, and 6c, and the base portions 8a and 8b are omitted for easy understanding. Portions illustrated in grey in FIG. 4B and FIG. 4C represent members that do not move along an XY plane. Such members include the vibration motors 5a, 5b, and 5c, the springs 6a, 6b, and 6c, the sensors 7a, 7b, and 7c, and the base portions 8a and 8b. Portions illustrated in blank represent members that are movable along the XY plane. Such members include the image sensor 1, the frame 2, and the rolling balls 3.

The image sensor 1 is supported by the frame 2. A point O in FIG. 4A represents the center of the imaging plane of the image sensor 1. The center of the imaging plane is an intersecting point between a center line Ly and a center line Lx respectively in the X axis direction and the Y axis direction of the imaging plane as viewed in the Z axis direction orthogonal to the imaging plane.

The frame 2 supports the image sensor 1. The frame has a shape of a plate, and has a supporting portion 2A at the center of a surface of the plate protruding in the Z axis direction to support the image sensor 1. As illustrated in FIG. 4B, the supporting portion 2A has a U shape (or channel shape) as viewed in the X axis direction, and thus has a space in which the vibration motor 5a is arranged. The frame 2 may have any other shape as long as the image sensor 1 can be supported.

The rolling balls 3 support the frame 2 so as to allow the frame 2 to move relative to the base portion 8a. More specifically, the rolling balls 3 are provided between the frame 2 and the base portion 8a, and support the frame 2 so as to be movable along the XY plane that is directions parallel with the imaging plane of the image sensor 1. In this example, three rolling balls 3 are disposed close to outer edges of the frame 2. However, any other configuration may be employed as long as the frame 2 can be movably supported. The rolling balls 3 correspond to an example of a movably supporting member.

The springs 4 bias the frame 2 towards the rolling balls 3. More specifically, the springs 4 bias the frame 2 so that the rolling balls 3 can be constantly in contact with the frame 2 and the base portion 8a. As illustrated in FIG. 4B, the springs 4 bias the frame 2 in a direction indicated by arrows n, so that the play between the rolling balls 3 and the frame 2 and the play between the rolling balls 3 and the base portion 8a are prevented. For example, tension springs may be used for the springs 4. The frame 2 may be biased with tension applied to the frame 2 by wires, instead of biasing the frame 2 with the springs 4 as in this configuration.

The vibration motors 5a, 5b, and 5c move the frame 2 in directions parallel with the imaging plane of the image sensor 1. The vibration motor 5a is provided between the frame 2 and the base portion 8a. The vibration motors 5b and 5c are provided between the frame 2 and the base portion 8b.

The springs 6a, 6b, and 6c respectively press the vibration motors 5a, 5b, and 5c towards the frame 2. The spring 6a is provided between the base portion 8a and the vibration motor 5a. The spring 6b is provided between the base portion 8b and the vibration motor 5b. The spring 6c is provided between the base portion 8b and the vibration motor 5c.

Accordingly, the protrusions 502 of the vibration motors 5a, 5b, and 5c are pressed against the portions of the frame 2 due to action of the springs 6a, 6b, and 6c, respectively. When the vibration motors 5a, 5b, and 5c vibrate, the frame 2 in pressure contact with the protrusions 502 moves. More specifically, as illustrated in FIG. 4A, the vibration motor 5a moves the frame 2 in a direction indicated by an arrow ma (Y axis direction). The vibration motor 5b moves the frame 2 in a direction indicated by an arrow mb (X axis direction). The vibration motor 5c moves the frame 2 in a direction indicated by an arrow mc (X axis direction).

Driving force is produced on the portions of the frame 2 that are in pressure contact with the protrusions 502 of the vibration motors 5a, 5b, and 5c, due to frictional force produced by ultrasonic vibrations of the vibration motors 5. Thus, the portions are made of a material that has resistance against the frictional force, or are subjected to surface processing so as to have resistance against the frictional force.

The sensors 7a, 7b, and 7c detect displacement of the frame 2 respectively in the directions indicated by the arrows ma, mb, and mc. For example, linear sensors can be used for the sensors 7a, 7b, and 7c. The linear sensors may be magnetic sensors, optical sensors, or any other sensor employing an appropriate method.

The base portions 8a and 8b are fixed to a main body of the camera 100. The base portions 8a and 8b are respectively positioned on a front surface side and a rear surface side of the frame 2. The base portion 8a has one portion penetrating through a space in the supporting portion 2A and functions as a ground surface for one end of the spring 6a.

With this configuration, the vibration motors 5a, 5b, and 5c can drive the frame 2 in the directions indicated by the arrows ma, mb, and mc. Furthermore, the sensors 7a, 7b, and 7c can respectively detect displacement in the directions indicated by the arrows ma, mb, and mc. Thus, in the camera 100, the control circuit 121 can perform feedback control an the vibration motors 5a, 5b, and 5c, based on the displacement detected by the sensors 7a, 7b, and 7c. Vectors in the directions indicated by the arrows ma, mb, and mc are linearly independent vectors.

The center O of the imaging plane of the image sensor 1 is included in the projection areas of the vibration units 501 of the vibration motors 5a and 5b in a direction orthogonal to the imaging plane of the image sensor 1 (hatched portion H in FIG. 4A), among the vibration motors 5a, 5b, and 5c according to the present exemplary embodiment. In other words, the vibration unit 501 of each of the vibration motors 5a and 5b overlaps with the center O of the imaging plane of the image sensor 1 as viewed in the Z axis direction. The vibration unit 501 of the vibration motor 5c is separated from the center O of the imaging plane of the image sensor 1 in a direction orthogonal to the Z axis direction, as viewed in the Z axis direction.

FIG. 4A illustrates a case where the centers of the vibration units 501 of the vibration motors 5a and 5b substantially match the center O of the imaging plane of the image sensor 1.

Next, an operation of the image stabilizing mechanism of the image sensor unit 103 is described with reference to FIGS. 5A, 5B, and 5O.

FIG. 5A illustrates a state where the frame 2 is driven by the vibration motors 5b and 5c to be displaced in the same direction in the directions indicated by the arrows mb and mc, and is driven by the vibration motor 5a so as not to be displaced in the directions indicated by the arrow ma. In the state illustrated in FIG. 5A, the image sensor 1 supported by the frame 2 can be moved in the X axis direction.

FIG. 5B illustrates a state where the frame 2 is driven by the vibration motor 5a to be displaced in the direction indicated by the arrow ma, and is driven by the vibration motors 5b and 5c so as not to be displaced in the directions indicated by the arrows mb and mc. In the state illustrated in FIG. 5B, the image sensor 1 supported by the frame 2 can be moved in the Y axis direction.

FIG. 5C illustrates a state where the frame 2 is driven by the vibration motor 5c to be displaced in the direction indicated by the arrow mc, and is driven by the vibration motors 5a and 5b so as not to be displaced in the directions indicated by the arrows ma and mb. In the state illustrated in FIG. 5C, the image sensor 1 supported by the frame 2 can be moved in a rotational direction (a direction indicated by an arrow R) about the center O.

A mode in which the vibration motors 5a, 5b, and 5c cause the image sensor 1 to rotationally move about a direction (Z axis direction) orthogonal to the image plane, as illustrated in FIG. 5O, is referred to as a first operation mode. In the first operation mode, the camera roll-shake can be corrected.

A mode in which the image sensor 1 is moved based on a combination of movements illustrated in FIGS. 5A, 5B, and 5O is referred to as a second operation mode. More specifically, in the second operation mode, the image sensor 1 is moved by the vibration motors 5a, 5b, and 5c, by combining the rotational movement for moving about the direction (Z axis direction) orthogonal to the imaging plane with parallel movement for moving in a direction (XY plane direction) parallel with the imaging plane. In the second operation mode, the camera roll-shake and the camera shift-shake can be corrected.

The control circuit 121 of the camera 100 drives the vibration motors 5a, 5b, and 5c for the image stabilizing mechanism to achieve the first operation mode or the second operation mode. The vibration motors 5a, 5b, and 5c may move the frame 2 in any direction as long as the directions indicated by the arrows ma, mb, and mc correspond to linearly independent vectors. How the vibration motors 5a, 5b, and 5c are arranged is not particularly limited.

Next, operations for correcting camera shake, performed by the camera 100 using the image stabilizing mechanism is described.

First, the control circuit 121 calculates the amount of the camera shift-shake and the camera roll-shake, based on an output from the camera shake detection sensor 117 or the image sensor 1. The control circuit 121 calculates a target position to which the image sensor 1 is to be moved, for correcting the camera shift-shake and the camera roll-shake. Next, the control circuit 121 calculates displacement of the image sensor required in each of the directions indicated by the arrows ma, mb, and mc based on the calculated target position. The control circuit 121 drives the vibration motors 5a, 5b, and 5c to move the image sensor 1, using the displacement detected by the sensors 7a, 7b, and 7c as a feedback and using the calculated displacement as the target. Thus, an image captured by the image sensor 1 can be prevented from blurring. This processing can be implemented by the CPU 121a of the control circuit 121 executing a program stored in the control circuit 121.

Next, operations performed by the image stabilizing mechanism of the image sensor unit 103 in cases where the lens device 200 attached to the camera 100 includes and does not include the shift-shake correcting mechanism are described.

In the case where the lens device 200 attached to the camera 100 includes the shift-shake correcting mechanism, the lens device 200 is in charge of correcting the camera shake in a shift direction. In such a case, the image stabilizing mechanism of the image sensor unit 103 operates in the first operation mode to correct only the camera roll-shake. More specifically, as illustrated FIG. 5C, the vibration motor 5c drives the image sensor 1 so as to displace the image sensor the direction indicated by the arrow mc, and the vibration motors 5a and 5b drive the image sensor 1 in so as to maintain the position of the center O of the image sensor 1. As the vibration motors 5a, 5b, and 5c drives the image sensor unit 103 in this way, no supporting mechanism is required at a rotation center shaft even in a case where the camera roll-shake is mainly corrected. Thus, the configuration of the image stabilizing mechanism of the image sensor unit 103 can be simplified. The vibration motor 5c is required to achieve large displacement and high-speed driving, and thin consumes power as appropriate. On the other hand, the vibration motors 5a and 5b maintain the position of the center O of the image sensor 1. In the present example embodiment, the vibration motors 5a and 5b are positioned close to the center O of the imaging plane. Thus, the vibration motors 5a and 5b can maintain the position of the center O of the image sensor 1 with small displacement and low speed. Therefore, the position of the center O of the image sensor 1 can be maintained with the vibration motors 5a and 5b consuming a small amount of power.

In the case where the lens device 200 attached to the camera 100 includes no shift-shake correcting mechanism, the camera 100 is in charge of correcting both the camera shift-shake and the camera roll-shake. In this case, the image stabilizing mechanism of the image sensor unit 103 operates in the second operation mode to correct both the camera shift-shake and the camera roll-shake. More specifically, the vibration motors 5a, 5b, and 5c are driven based on a combination of the movements illustrated in FIGS. 5A, 5B, and 50 so that the image sensor 1 is displaced as required. With driving of the vibration motors 5a, 5b, and 5c, both the camera shift-shake and the camera roll-shake can be corrected. Accordingly, the image stabilizing mechanism that can operate to mainly correct the camera roll-shake can also correct the camera shift-shake when the lens device 200 attached to the camera 100 includes no shift-shake correcting mechanism.

The case where the lens device 200 attached to the camera 100 is provided with no shift-shake correcting mechanism includes a case where the lens device 200 attached to the camera 100 is provided with the shift-shake correcting mechanism but does not correct the camera shift-shake. This is because the lens device 200 including the shift-shake correcting mechanism does not correct the camera shift-shake depending on an intension of a user, an image capturing condition, or a power supply status.

As described above, in the image stabilizing mechanism according to the present example embodiment, the vibration unit 501 at least one of (two of, in the present exemplary embodiment) the vibration motors 5a and 5b overlaps the center O of the imaging plane of the image sensor 1 when viewed in the direction orthogonal to the imaging plane f the image sensor 1. Thus, when the camera roll-shake is corrected, the vibration motors 5a and 5b support the image sensor 1, so that the supporting mechanism for supporting the rotation shaft can be omitted, whereby the configuration can be simplified. Not only the camera roll-shake but also the camera shift-shake can be corrected by driving the vibration motors 5a, 5b, and 5c. In this way, the image stabilizing mechanism according to the present exemplary embodiment can correct the camera roll-shake and can also correct the camera shift-shake with a simplified configuration.

In the present example embodiment, the vibration motors 5a, 5b, and 5c each having the two protrusions 502 are used. However, for the vibration motors 5a and 5b that are positioned close to the center O of the imaging plane, each of the vibration motors 5a and 5b preferably has a single protrusion 502. The vibration motor having a single protrusion 502 contacts the frame 2 at a point. This ensures small rotation moment involved in the rotational movement of the frame 2 about the center O driven by the vibration motor 5c. Therefore, only a small amount of power needs to be consumed by the vibration motor 5c in the first operation mode.

In the present example embodiment, the three vibration motors 5a, 5b, and 5c are all provided on the base portions 8a and 8b. However, it is not limited thereto, and at least one of the vibration motors 5a, 5b, and 5c may be provided on the frame 2.

Next, a configuration of an image sensor unit 203 including an image stabilizing mechanism according to a second exemplary embodiment is described. Here, a configuration different from that of the first example embodiment is described. Components that are similar to those in the first example embodiment are denoted the same reference numerals, and the descriptions thereof will be omitted accordingly here.

FIGS. 6A, 6B, 6C are diagrams illustrating a configuration of the image sensor unit 203. More specifically, FIG. 6A is a front view of the image sensor unit 203 when viewed in the Z axis direction. FIG. 6B is a cross-sectional view taken along line I-I. FIG. 6C is a cross-sectional view taken along line II-II.

In FIG. 6A, the springs 4, springs 16a, 16b, and 16c, and base portions 18a and 18b are omitted for the sake of easy understanding. Portions illustrated in grey in FIG. 6B and FIG. 6C represent members that do not move along the XY plane. Such members include the base portions 18a and 18b. Portions illustrated in blank represent members that are movable along the XY plane. Such members include the image sensor 1, a frame 12, the rolling balls 3, vibration motors 15a, 15b, and 15c, and the springs 16a, 16b, and 16c.

In the first present example embodiment, the frame 2 serving as a moving member moves by receiving the frictional force from the vibration motors 5a, 5b, and 5c provided to the base portions 8a and 8b. In the present example embodiment, the frame 12 is moved with the base portion 18b, serving as a fixed member, receiving frictional force from the vibration motors 15a, 15b, and 15c provided to the frame 12. The frame 12 according to the present exemplary embodiment has a supporting portion 12B that extends in the Z axis direction from a back surface side of the frame 12 and then is bent to the direction so as to overlap the base portion 18b provided with a.

The vibration motors 15a and 15c are provided between the frame 12 and the base portion 18b. The vibration motor 15b is provided between the base portion 18b and the supporting portion 12B.

The springs 16a, 16b, and 16c are arranged to bring the vibration motors 15a, 15b, and 15c into pressure contact with the base portion 18b. More specifically, the spring 16a is provided between the frame 12 and the vibration motor 15a. The spring 16b is provided between the supporting portion 12B and the vibration motor 15b. The spring 16c is provided between the frame 12 and the vibration motor 15c. The springs 16a, 16b, and 16c are provided to the frame 12 in the similar manner to the vibration motors 15a, 15b, and 15c.

Driving force is produced on the portions of the base portion 18b in pressure contact with the protrusions 502 of the vibration motors 15a, 15b, and 15c, due to frictional force produced by ultrasonic vibrations of the vibration motors. Thus, the portions are made of a material that has resistance against the frictional force, are subjected to surface processing so as to have resistance against the frictional force.

The center O of the imaging plane of the image sensor 1 is included in the projection areas of the vibration units 501 of the vibration motors 15a and 15b in a direction orthogonal to the imaging plane of the image sensor 1 (hatched portion H in FIG. 6A), among the vibration motors 5a, 5b, and 5c according to the present exemplary embodiment In other words, the vibration unit 501 of each of the vibration motors 15a and 15b overlaps the center O of the imaging plane of the image sensor 1 when viewed in the Z axis direction. The vibration unit 501 of the vibration motor 15c is separated from the center O of the imaging plane of the image sensor 1, in a direction orthogonal to the Z axis direction, when viewed in the Z axis direction.

Therefore, the image stabilizing mechanism according to the present exemplary embodiment can correct the camera roll-shake and can also correct the camera shift-shake with a simplified configuration, as in the first example embodiment.

In the present example embodiment, the vibration motors 15a, 15b, and 15c are provided to the frame 12, and thus integrally move with the frame 12. In other words, the movement of the frame 12 involves no relative positional displacement between the vibration motors 15a and 15b and the center O of the imaging plane. Therefore, the position of the center O can be maintained with small displacement and low speed achieved by the vibration motors 15a and 15b, whereby even more effective power saving can be achieved than in the first exemplary embodiment.

In the present example embodiment, the vibration motors 15a, 15b, and 15c each having the two protrusions 502 are used. However, for the vibration motors 15a and 15b, positioned close to the center O of the imaging plane, each of the vibration motors 15a and 15b preferably has a single protrusion 502. The vibration motor having a single protrusion 502 contacts the base portion 18b at a point. This ensures small rotation moment involved in the rotational movement of the frame 12 about the center O driven by the vibration motor 15c. As a result, only a small amount of power needs to be consumed by the vibration motor 15c in the first operation mode.

In the present example embodiment, the three vibration motors 15a, 15b, and 15c are all provided on the frame 12. However, it is not limited to that case, and at least one of the vibration motors 15a, 15b, and 15c may be provided on the base portions 18a and 18b.

Next, a configuration of an image sensor unit 303 including an image stabilizing mechanism according to a third example embodiment is described. Here, a configuration different from that of the first example embodiment is described. Components that are similar to those in the first example embodiment are denoted the same reference numerals, and the descriptions thereof will be omitted accordingly here.

Figure 7A:
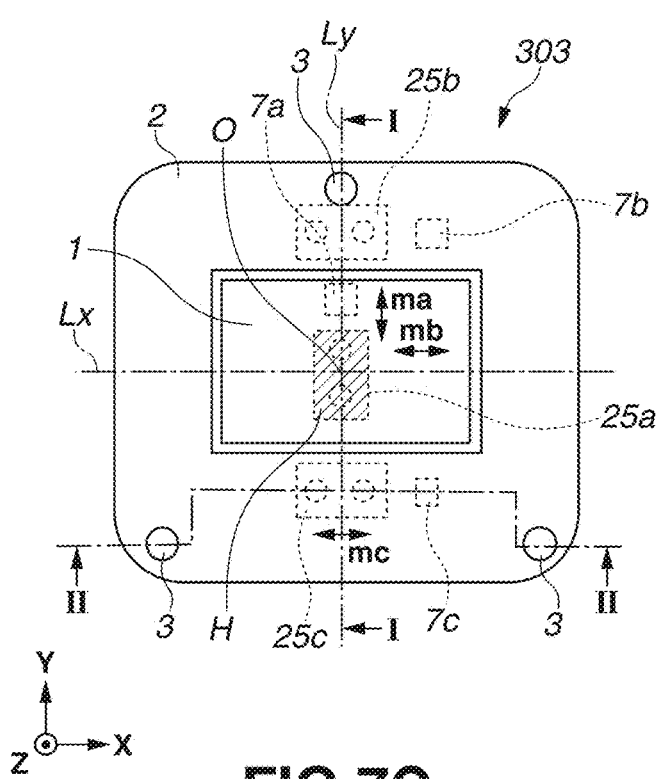
FIGS. 7A, 7B, and 7C are diagrams illustrating an example of a configuration of an image stabilizing mechanism according to a third example embodiment.
Figure 7B:
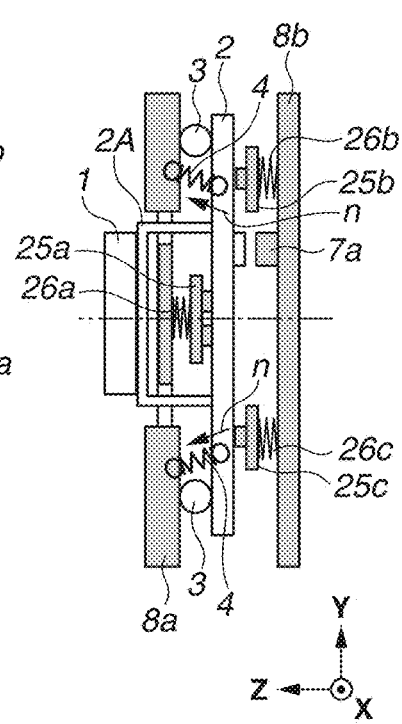
Figure 7C:
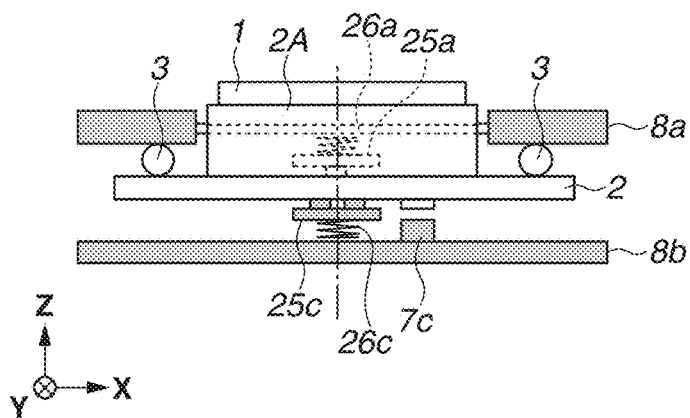

FIGS. 7A, 7B, and 7C are diagrams illustrating a configuration of the image sensor unit 303. More specifically, FIG. 7A is a front view of the image sensor unit 303 when viewed in the Z axis direction. FIG. 7B is a cross-sectional view taken along line I-I. FIG. 7C is a cross-sectional view taken along line II-II.

In FIG. 7A, the springs 4, springs 26a, 26b, and 26c, and the base portions 8a and 8b are omitted for the sake of easy understanding. Portions illustrated in grey in FIG. 7B and FIG. 7C represent members that do not move along the XY plane. Such members include the vibration motors 25a, 25b, and 25c, the springs 26a, 26b, and 26c, the sensors 7a, 7b, and 7c, and the base portions 8a and 8b. Portions illustrated in blank represent members that are movable along the XY plane. Such members include the image sensor 1, the frame 2, and the rolling balls 3.

In the present example embodiment, the positions of the vibration motor 25b and the spring 26b are different from the positions of the vibration motor 5b and the spring 6b according to the first exemplary embodiment. On the other hand, the vibration motors 25a and 25c and the springs 26a and 26c are respectively similar to the vibration motors 5a and 5c and the springs 6a and 6c according to the first example embodiment.

The vibration motor 25b is arranged at a position an the axis Ly and not overlapping the center O of the imaging plane, when viewed in the Z axis direction. The vibration motor 25b is disposed on an opposite side of the vibration motor 25c across the axis Lx. Accordingly, the vibration motor 25a is positioned between the vibration motor 25b and the vibration motor 25c. The position of the vibration motor 25b is not particularly limited to the position, and may be any position not overlapping the center O of the imaging plane. The spring 28b is arranged to match the position of the vibration motor 25b, to be capable of bringing the vibration motor 25b into pressure contact with the frame 2.

In the present example embodiment, a center O of the imaging plane of the image sensor 1 is included in a projection area, projected in a direction orthogonal to the imaging plane of the image sensor 1, of only the vibration unit 501 of the vibration motor 25a (a hatched portion H in FIG. 7A) among the vibration motors 25a, 25b, and 25c. In other words, only the vibration unit 501 of the vibration motor 25a overlaps the center O of the imaging plane of the image sensor 1 when viewed in the Z axis direction. On the other hand, the vibration unit 501 of each of the vibration motors 25b and 25c is separated from the center O of the imaging plane of the image sensor 1, in a direction orthogonal to the Z axis direction, as viewed in the Z axis direction.

Next, an operation of the image stabilizing mechanism of the image sensor unit 303 is described with reference to FIGS. 8A, 8B, and 8C.

FIG. 8A illustrates a state where the frame 2 is driven by the vibration motors 25b and 25c to be displaced in the same directions indicated by the arrows mb and mc, and is driven by the vibration motor 25a so as not to be displaced in the direction indicated by the arrow ma. In the state illustrated in FIG. 8A, the image sensor 1 supported by the frame 2 can be moved in the X axis direction.

FIG. 8B illustrates a state where the frame 2 is driven by the vibration motor 25a to be displaced in the direction indicated by the arrow ma, and is driven by the vibration motors 25b and 25c so as not to be displaced in the directions indicated by the arrows mb and mc. In the state illustrated in FIG. 8B, the image sensor 1 supported by the frame 2 can be moved in the Y axis direction.

FIG. 8C illustrates a state where the frame 2 is driven by the vibration motors 25b and 25c to be displaced in opposite directions indicated by the arrows mb and mc, and is driven by the vibration motor 25a so as not to be displaced in the direction indicated by the arrow ma. In the state illustrated in FIG. 8C, the image sensor 1 supported by the frame 2 can be moved in a rotational direction (direction indicated by an arrow R) about the center O.

As illustrated in FIG. 8C, a mode in which the vibration motors 25a, 25b, and 25c cause the image sensor to rotationally move about a direction (Z axis direction) orthogonal to the image plane as the center axis of the rotation is referred to as a first operation mode. In the first operation mode, the camera roll-shake can be corrected.

A mode in which the image sensor 1 is moved based on a combination of movements illustrated in FIGS. 8A, 8B, and 8C is referred to as a second operation mode. More specifically, in the second operation mode, the image sensor 1 is moved by the vibration motors 25a, 25b, and 25c, by combining the rotational movement for moving about the direction (Z axis direction) orthogonal to the imaging plane with parallel movement for moving in a direction (XY plane direction) parallel with the imaging plane. In the second operation mode, the camera roll-shake and the camera shift-shake can be corrected.

The control circuit 121 of the camera 100 drives the vibration motors 25a, 25b, and 25c of the image stabilizing mechanism to achieve the first operation mode or the second operation mode. The vibration motors 25a, 25b, and 25c may move the frame 2 in any direction as long as the vectors in the directions indicated by the arrows ma, mb, and mc correspond to linearly independent vectors. How the vibration motors 25a, 25b, and 25c are arranged is not particularly limited thereto. How the camera 100 corrects camera shake by using the image stabilizing mechanism is similar to that in the first exemplary embodiments.

Next, operations performed by the image stabilizing mechanism of the image sensor unit 303 in each of the cases where the lens device 200 attached to the camera 100 includes and does not include the shift-shake correcting mechanism is described.

First, in the case where the attached lens device 200 includes the shift-shake correcting mechanism, the lens device 200 is in charge of correcting the camera shake in a shift direction. In such a case, the image stabilizing mechanism of the image sensor unit 303 operates in the first operation mode to correct only the camera roll-shake. More specifically, as illustrated in FIG. 8C, the vibration motors 25b and 25c are driven so as to displace the image sensor 1 in the directions indicated by the arrows mb and mc, and the vibration motor 25a is driven so as to maintain the position of the center O of the image sensor 1. At that time, the vibration motors 25b and 25c are required to achieve large displacement and high-speed driving, and consume power as necessary. On the other hand, the vibration motor 25a maintains the position of the center O of the image sensor 1. In the present exemplary embodiment, the vibration motor 25a is positioned close to the center O f the imaging plane. Thus, the vibration motor 25a can maintain the position of the center O of the image sensor 1 with small displacement and low speed. Therefore, the position of the center O of the image sensor 1 can be maintained with the vibration motor 25a consuming a small amount of power.

Next, in the case where the attached lens device 200 includes no shift-shake correcting mechanism, the camera 100 is in charge of correcting both the camera shift-shake and the camera roll-shake. In this case, the image stabilizing mechanism of the image sensor unit 303 operates in the second operation mode to correct both the camera shift-shake and the camera roll-shake. More specifically, the vibration motors 25a, 25b, and 25c drives the image sensor 1 to displace as required based on a combination of the movements illustrated in FIGS. 8A, 8B, and 8C. As the vibration motors 25a, 25b, and 25c drives the image sensor 1 in this way, both the camera shift-shake and the camera roll-shake can be corrected.

As described above, in the image stabilizing mechanism according to the present example embodiment, the vibration unit 501 of at least one vibration motor 25a overlaps the center O of the imaging plane of the image sensor 1 when viewed in the direction orthogonal to the imaging plane f the image sensor 1. Thus, when the camera roll-shake is corrected, the vibration motor 25a supports the image sensor 1. Therefore, the supporting mechanism for supporting the rotation shaft can be omitted, whereby the configuration can be simplified. Not only the camera roll-shake but also the camera shift-shake can be corrected by driving the vibration motors 25a, 25b, and 25c. In this way, the image stabilizing mechanism according to the present example embodiment can correct the camera roll-shake and can also correct the camera shift-shake with a simplified configuration.

In the present example embodiment, the camera roll-shake can easily be corrected by the two vibration motors 25b and 25c, in the vibration motors 25a, 25b, and 25c.

In the present example embodiment, the vibration motors 25a, 25b, and 25c each having the two protrusions 502 are used. However, the vibration motor 25a, positioned close to the center O of the imaging plane, preferably has a single protrusion 502. The vibration motor having a single protrusion 502 is in one point contact with the frame 2. This ensures small rotation moment involved in the rotational movement of the frame 2 about the center O caused by the vibration motors 25b and 25c. Therefore, only a small amount of power needs to be consumed by the vibration motors 25b and 25c in the first operation mode.

In the present example embodiment, the three vibration motors 25a, 25b, and 25c are all provided on the base portions 8a and 8b. However, this should not be construed in a limiting sense, and at least one of the vibration motors 25a, 25b, and 25c may be provided on the frame 2.

Next, a configuration of an image sensor unit 403 including an image stabilizing mechanism according to a fourth exemplary embodiment is described. In the present example embodiment, a configuration different from that of the third example embodiment is now herein described. Components that are similar to those in the third example embodiment are denoted the same reference numerals, and will not be described in detail.

Figure 9A:
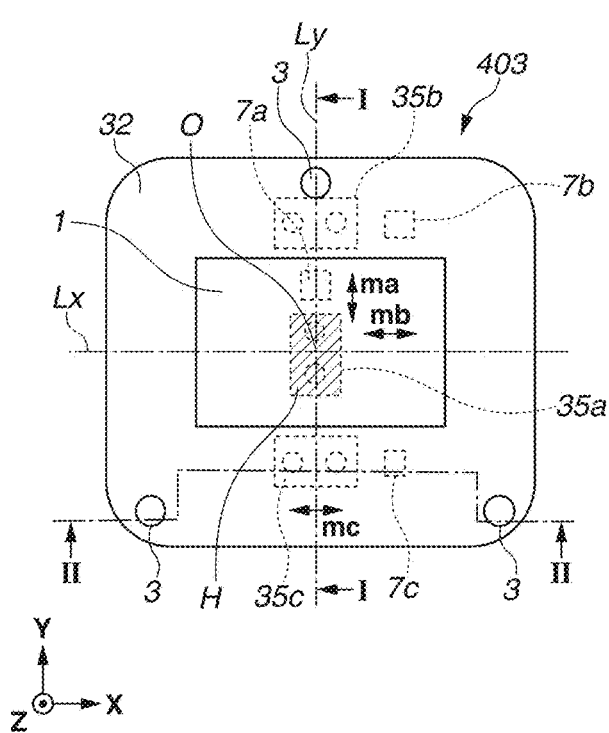
FIGS. 9A, 9B, and 9C are diagrams illustrating an example of a configuration of an image stabilizing mechanism according to a fourth example embodiment.
Figure 9B:
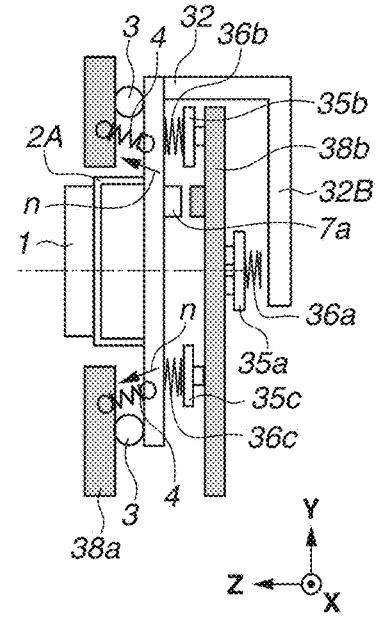
Figure 9C:
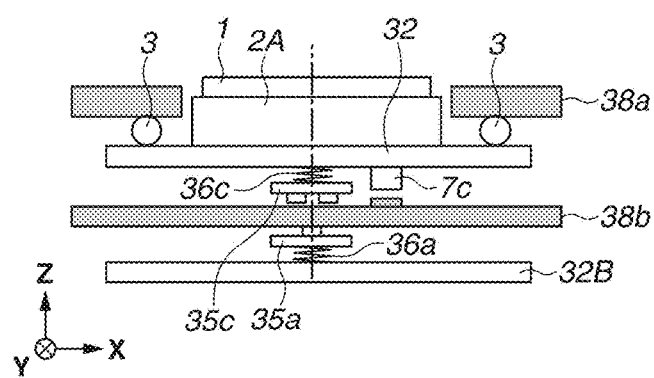

FIGS. 9A, 9B, and 9C are diagrams illustrating a configuration of the image sensor unit 403. More specifically, FIG. 9A is a front view of the image sensor unit 403 when viewed in the Z axis direction. FIG. 9B is a cross-sectional view taken along line I-I. FIG. 9C is a cross-sectional view taken along line II-II.

In FIG. 9A, the springs 4, springs 36a, 36b, and 36c, and base portions 38a and 38b are omitted for the sake of understanding. Portions illustrated in grey in FIG. 9B and FIG. 9C represent members that do not move along the XY plane. Such members include the base portions 38a and 38b. Portions illustrated in blank represent members that are movable along the XY plane. Such members include the image sensor 1, a frame 32, the rolling balls 3, vibration motors 35a, 35b, and 35c, the springs 36a, 36b, and 36c, and the sensor 7a, 7b, and 7c.

In the third example embodiment, the frame 2 serving as a moving member moves by receiving the frictional force from the vibration motors 25a, 25b, and 25c provided to the base portions 8a and 8b. In the present exemplary embodiment, the frame 32 is moved by the base portion 38b, serving as a fixed member, receiving frictional force from the vibration motors 35a, 35b, and 35c provided to the frame 32. The frame 32 according to the present exemplary embodiment has a supporting portion 32B that extends from the back side in the Z axis direction and then bends to overlap the base portion 38b.

The vibration motor 35a is provided between the base portion 38b and the supporting portion 32B. The vibration motors 35b and 35c are provided between the frame 32 and the base portion 38b The springs 36a, 36b, and 36c are positioned to bias the vibration motors 35a, 35b, and 35c toward the base portion 38b. More specifically, the spring 36a is provided between the supporting member 32B and the vibration motor 35a. The spring 36b is provided between the frame 32 and the vibration motor 35b. The spring 36c is provided between the frame 32 and the vibration motor 35c. The springs 36a, 36b, and 36c are provided to the frame 32 in the similar manner to the vibration motors 35a, 35b, and 35c.

Driving force is produced on the portions of the base portion 38b in pressure contact with the protrusions 502 of the vibration motors 35a, 35b, and 35c, due to frictional force produced by ultrasonic vibrations of the vibration motors. Thus, the portions are made of a material that has resistance against the frictional force, or are subjected to surface processing to have resistance against the frictional force.

In the present example embodiment, the center O of the imaging plane of the image sensor 1 is included only in the projection area of the vibration unit 501 of the vibration motor 35a in a direction orthogonal to the imaging plane of the image sensor 1 (hatched portion H in FIG. 9A), among the vibration motors 35a, 35b, and 35c according to the present exemplary embodiment In other words, the vibration unit 501 of only the vibration motor 35a overlaps the center O of the imaging plane of the image sensor 1 when viewed in the Z axis direction. The vibration unit 501 of each of the vibration motors 35b and 35c is separated from the center O of the imaging plane of the image sensor 1, in a direction orthogonal to the Z axis direction, when viewed in the Z axis direction.

Therefore, the image stabilizing mechanism according to the present example embodiment can correct the camera roll-shake and can also correct the camera shift-shake with a simplified configuration, as the third example embodiment.

In the present example embodiment, the vibration motors 35a, 35b, and 35c are provided to the frame 32, and thus integrally move with the frame 32. As a result, the movement of the frame 32 involves no relative positional displacement between the vibration motor 35a and the center O of the imaging plane. Therefore, the position of the center O can be maintained with small displacement and low speed achieved by the vibration motor 35a, whereby more effective power saving can be achieved than that in the third example embodiment.

In the present example embodiment, the vibration motors 35a, 35b, and 35c each having the two protrusions 502 are used. However, the vibration motor 35a, positioned close to the center O of the imaging plane, preferably has a single protrusion 502. The vibration motor having a single protrusion 502 is in one point contact with the base portion 38b. This ensures small rotation moment involved in the rotational movement of the frame 32 about the center O caused by the vibration motors 35b and 35c. Therefore, only a small amount of power needs to be consumed by the vibration motors 35b and 35c in the first operation mode.

In the present example embodiment, the three vibration motors 35a, 35b, and 35c are all provided on the frame 32. However, this should not be construed in a limiting sense, and at least one of the vibration motors 35a, 35b, and 35c may be provided on the base portions 38a and 38b.

Various example embodiments of the present disclosure are described above. However, the disclosure is not limited to the example embodiments described above. The example embodiments can be changed without departing from the scope of the present disclosure, and can be combined as appropriate.

In the example embodiments described above, the cases where the camera roll-shake and the camera shift-shake are corrected are described. However, the correction is not limited to complete correction of the camera roll-shake and the camera shift-shake, and includes suppression of the camera roll-shake and the camera shift-shake.

In the example embodiments described above, the cases where the present disclosure is applied to the digital single-lens reflex camera 100 are described. However, this should not be construed in a limiting sense. The present invention can be applied to any devices including an image sensor, and may not be capable of having a lens device attached. More specifically, the present invention can be applied to devices including an image sensor, such as a personal digital assistant (PDA), a mobile phone terminal, a smartphone, a mobile image viewer, a digital photo frame, a music player, a game device, an electronic book reader, and the like.

In the example embodiments described above, the center of the vibration unit 501 of the vibration motor substantially matches the center O of the imaging plane of the image sensor 1. Alternatively, the vibration unit 501 of the vibration motor may be arranged close enough to the center O of the imaging plane to be overlapped with the center O.

In the example embodiments described above, the three motors are a vibration motor. However, this should not be construed in a limiting sense. As long as the motor arranged close to the center O is a vibration motor, the other motors may be motors other than the vibration motors, such as electromagnetic motors.

The present disclosure can be implemented through processing including supplying a program for implementing at least one of the functions of the exemplary embodiments described above to the camera 100 via a network or a storage medium and reading and executing the program by at least one processor in a computer of the camera 100. Furthermore, the present invention can be implemented with a circuit (e.g., an application specific integrated circuit (ASIC)) that implements at least one of the functions.

While the present disclosure has been described with reference to exemplary embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2017-062669, filed Mar. 28, 2017, which is hereby incorporated by reference herein in its entirety.

What is claimed is:

1. An image capturing apparatus comprising:
an image sensor;
a frame that supports the image sensor; and
one or more driving members configured to provide parallel movement of the frame in a direction parallel with an imaging plane of the image sensor,
wherein at least one of the one or more driving members includes a vibrator configured to generate vibration, and
wherein, when viewed in a direction orthogonal to the imaging plane of the image sensor, the vibrator of the at least one of the one or more driving members overlaps a center of the imaging plane of the image sensor.

2. The image capturing apparatus according to claim 1, wherein the one or more driving members include a first vibration motor having a first vibrator and a second vibration motor having a second vibrator, and
wherein, when viewed in the direction orthogonal to the imaging plane of the image sensor, the first vibrator and the second vibrator overlap each other and overlap the center of the imaging plane of the image sensor.

3. The image capturing apparatus according to claim 2, wherein the one or more driving members further include a third vibration motor having a third vibrator, and wherein, when viewed in the direction orthogonal to the imaging plane of the image sensor, the third vibrator is separated from the center of the imaging plane of the image sensor.

4. The image capturing apparatus according to claim 1, wherein the one or more driving members include a first vibration motor having a first vibrator, a second vibration motor having a second vibrator, and a third vibration motor having a third vibrator, wherein, when viewed in the direction orthogonal to the imaging plane of the image sensor, the first vibrator overlaps the center of the imaging plane of the image sensor, and wherein, when viewed in the direction orthogonal to the imaging plane of the image sensor, the second vibrator and the third vibrator are separated from the center of the imaging plane of the image sensor.

5. The image capturing apparatus according to claim 4, wherein, when viewed in the direction orthogonal to the imaging plane of the image sensor, the second vibrator and the third vibrator are arranged not to overlap each other.

6. The image capturing apparatus according to claim 1, wherein at least one driving member of the one or more driving members that overlaps the center of the imaging plane of the image sensor is in contact with the frame at one point.

7. The image capturing apparatus according to claim 1, wherein the one or more driving members integrally move with the frame.

8. The image capturing apparatus according to claim 1, further comprising a controller configured to perform control to drive the one or more driving members to achieve a first operation mode in which the image sensor makes rotational movement about the direction orthogonal to the imaging plane as a center of rotation or a second operation mode in which the image sensor is moved based on a combination of the rotational movement about the direction orthogonal to the imaging plane and parallel movement in a direction parallel with the imaging plane.

9. The image capturing apparatus according to claim 8, wherein a lens device is detachably attached to the image capturing apparatus, wherein, when the attached lens device corrects camera shake in a direction orthogonal to an optical axis, the controller is configured to drive the one or more driving members to achieve the first operation mode, and wherein, when the attached lens device does not correct camera shake in the direction orthogonal to the optical axis, the controller is configured to drive the one or more driving members to achieve the second operation mode.

* * * * *